United States Patent
van der Schaar et al.

(10) Patent No.: US 6,785,334 B2
(45) Date of Patent: Aug. 31, 2004

(54) METHOD FOR TRANSMISSION CONTROL IN HYBRID TEMPORAL-SNR FINE GRANULAR VIDEO CODING

(75) Inventors: Mihaela van der Schaar, Ossining, NY (US); Hayder Radha, East Lanbing, MI (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 410 days.

(21) Appl. No.: 09/930,671

(22) Filed: Aug. 15, 2001

(65) Prior Publication Data

US 2003/0035480 A1 Feb. 20, 2003

(51) Int. Cl.⁷ ............................................. H04N 7/12
(52) U.S. Cl. ........................... 375/240.16; 375/240.01
(58) Field of Search ............... 375/240.01, 240.11, 375/240.16, 240.19; 348/397.1, 398.1

(56) References Cited

U.S. PATENT DOCUMENTS

| | | | |
|---|---|---|---|
| 6,263,022 B1 * | 7/2001 | Chen et al. | 375/240.03 |
| 6,480,547 B1 * | 11/2002 | Chen et al. | 375/240.27 |
| 6,501,797 B1 * | 12/2002 | van der Schaar et al. | 375/240.12 |
| 6,510,329 B2 * | 1/2003 | Heckel | 600/310 |
| 6,580,754 B1 * | 6/2003 | Wan et al. | 375/240.01 |
| 2002/0006161 A1 * | 1/2002 | Van Der Schaar et al. | 375/240.11 |
| 2002/0168007 A1 * | 11/2002 | Lee | 375/240.03 |

FOREIGN PATENT DOCUMENTS

| | | | | |
|---|---|---|---|---|
| EP | 0361384 A2 | 4/1990 | | H04B/14/04 |
| WO | WO0067469 | 11/2000 | | H04N/5/00 |
| WO | WO0103441 | 1/2001 | | H04N/7/26 |
| WO | WO0139503 | 5/2001 | | H04N/7/24 |

* cited by examiner

Primary Examiner—Chris Kelley
Assistant Examiner—George A Bugg
(74) Attorney, Agent, or Firm—Michael E. Belk (57) ABSTRACT

In a Fine Granular Video encoding system, a method for determining the number of transmission bits of SNR encoded and temporally encoded video data within a frame to balance image quality and object motion is presented. In accordance with the principles of the invention, a number of transmission bits at a known bit-rate for a quality enhanced video frame and a temporal enhanced video frame is determined to balance image quality and object motion smoothness. In one aspect of the invention, the number of bits transmitted in each frame is determined by comparing a ratio of a measure of video encoded information within the quality enhanced video frame and a measure of video encode information within the quality enhanced video frame and the temporally enhanced video frame to a known threshold level. The number of transmission bits in each enhancement layer is then determined using a first method when the ratio is above a known threshold and using a second method otherwise. In a second aspect of the invention, the number of bits is determined by first determining a measure of motion activity and complexity. The number of transmission bits is determined using a first method when the motion activity is below a known measure or the complexity if above a known threshold. Otherwise a second method is used to determine the number of transmission bits in each enhancement layer.

38 Claims, 7 Drawing Sheets

METHOD FOR TRANSMISSION CONTROL IN HYBRID TEMPORAL-SNR FINE GRANULAR VIDEO CODING

FIELD OF THE INVENTION

This invention relates generally to video encoding and more specifically to determining number of transmitted data bits to balance image quality and motion smoothness.

BACKGROUND OF THE INVENTION

The flexibility of a Fine-Granular Scalability (FGS) video encoding enables it to support a wide range of transmission bandwidths as is described in U.S. Pat. No. 6,501,797B1, entitled "System and Method for Improved Fine Granular Scalable Video Using Base Layer Coding Information" filed on Jul. 6, 1999, and assigned to the assignee herein. An improved FGS video encoding method is disclosed in U.S. Pat. No. 6,639,943, entitled "Hybrid Temporal-SNR Fine Granular Scalability Video Coding," filed on Jun. 9, 2000 and assigned to the assignee herein. In the hybrid temporal-SNR (Signal-to-Noise Ratio) FGS video encoding method disclosed, the encoder is operable to encode video images into an SNR FGS only format or a hybrid temporal-SNR FGS format. A determination is made whether to transmit only SNR (i.e., quality) FGS encoded video data in a frame or to transmit hybrid temporal-SNR encoded video data in a frame. In the former case, a high quality image is transmitted as all the available bandwidth is utilized by data bits that contribute to the image quality, while in the latter case, the available bandwidth is occupied by data bits to enhance image quality and data bits to smooth object motion. When encoded video images are transmitted in the high quality first mode objects within the frame exhibit a "jerky" motion, while encoded video images transmitted in the second mode are of a lower quality. A disadvantage of this method is that once a mode is selected, the selected mode is not changed during the transmission. Hence, when the second mode of transmission is selected, a lower quality image is transmitted, even when there is no object motion from frame-to-frame.

An efficient use of the available network bandwidth is accordingly not achieved with the transmission mode selection method, as the transmission mode is not adapted to the video images.

Hence, a method or system is needed for determining a transmission mode that makes efficient use of and accommodates changes in transmission bandwidth and image motion from frame to frame in order to balance the received image quality and image object motion smoothness.

SUMMARY OF THE INVENTION

In a Fine Granular Video encoding system, a method for determining the number of transmission bits of encoded SNR and temporally enhanced video data to balance image quality and object motion is presented. In accordance with the principles of the invention, a number of transmission bits at a known bit-rate for each of a quality enhanced video image frame and a temporal enhanced video image frame is determined, in one aspect by, comparing a ratio of a measure of quality enhanced frame data and a measure of quality enhanced frame data and temporally enhanced frame data to a known threshold. The number of bits transmitted in each of the quality enhanced frame and the temporally enhanced frame is then determined using a first method when the ratio is above the known threshold and using a second method otherwise.

It is to be understood that these drawings are solely for purposes of illustrating the concepts of the invention and are not intended as a level of the limits of the invention. It will be appreciated that the same reference numerals, possibly supplemented with reference characters where appropriate, have been used throughout to identify corresponding parts.

DETAILED DESCRIPTION OF THE INVENTION

Figure 1:
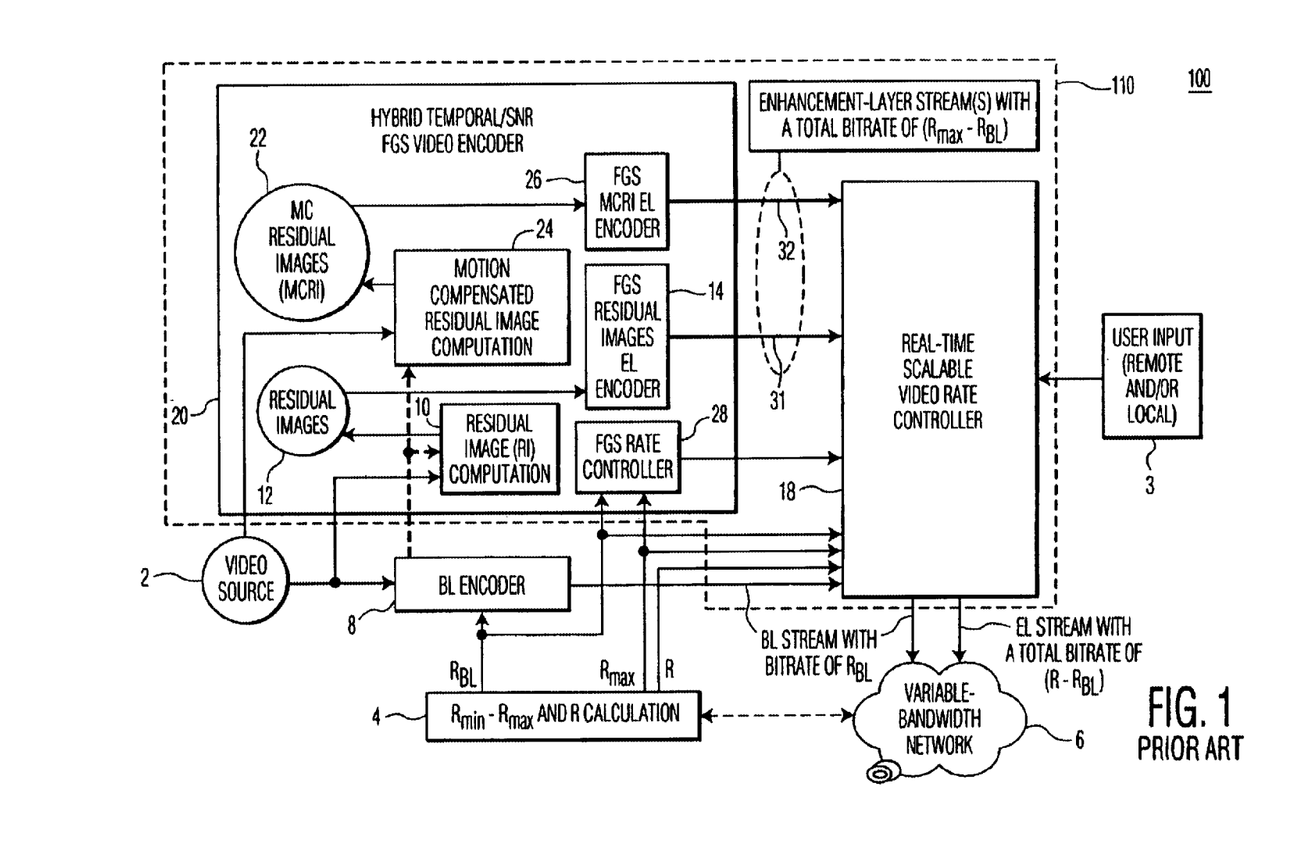
FIG. 1 depicts a conventional FGS encoding system.

FIG. 1 illustrates system 100 for encoding video images in a hybrid temporal-SNR FGS encoding structure. System 100 receives video images from video source 2 and transmits encoded video images across variable bandwidth network 6. As will be appreciated, video source 2 can be embodied by any type of video capturing device, such as television camera, video recorder/playback, analog or digital, etc., and the variable bandwidth network, may be a landline network, such as the Internet, a point-to-point network, such as the telephone network, or a wireless network, such as a satellite channel or a mobile receiving device, such as a cellular phone or computer.

Encoder 110 is composed principally of a base layer (BL) encoder 8, a hybrid temporal-SNR FGS video encoder 20 and video rate controller 18. Base layer encoder 8, which is described in the earlier referenced U.S. Pat. No. 6,501,797B1, encodes received video images into a base layer data stream. The encoded base layer represents a level of encoding that is representative of a minimally acceptable video image and is guaranteed to be transmitted over network 6. FGS layer encoder 20, which is described in the earlier referenced application, U.S. Pat. No. 6,639,943, encodes residual images generated between the input video images and base layer encoded images of the input video images into a video enhancement layer. The video enhancement layer is used to improve the quality of an image produced by the encoded base layer. Rate controller 18 determines the rate of transmission of the base layer and enhancement layer, and consequently the number of bits that can be transmitted, depending upon, for example, available bandwidth (R) and user preference. User preference can be input to controller 18 by user input 3.

As illustrated, video data from video source 2 is input to both BL encoder 8 and hybrid temporal-SNR FGS video encoder 20. BL encoder 8 encodes an original video image using a conventional frame-prediction coding technique and compresses the video data at a predetermined bit-rate represented as $R_{BL}$. Calculation block 4 sets $R_{BL}$ to a value between a minimum bit rate ($R_{min}$) and a maximum bit rate ($R_{max}$). In most cases $R_{BL}$ is set to Rmin to ensure even at lowest bandwidths, network 6 will be able to accommodate the video data coded by base layer encoder 8.

The original video data from source 2 and the coded video data (i.e., base layer encoded image) provided by BL encoder 8 are further provided to both a residual image (RI) computation block 10 and motion compensated residual image (MCRI) computation block 24 in hybrid encoder 20. RI computation block 10 and MCRI computation block 24 process the original video data and the coded video data to generate residual images 12 and motion compensated (MC) residual images 22, respectively. Residual images 12 are generated based on a difference between the pixels in this decoded video data and the corresponding pixels in the original video data. The MCRI computation block 24 receives coded video data from BL encoder 8 and also decodes this encoded video data. The MC residual images 22 are generated based on a motion-compensation approach from the decoded video data.

As a result of the above hybrid coding, two streams of enhancement layer frames are produced; a temporal enhancement stream 32, referred to herein as FGST encoded, and an enhancement stream 31, referred to herein as FGS encoded. The FGST encoded enhancement steam 32 includes the compressed FGS temporal frames from the MCRI EL encoder 26 while the FGS encoded enhancement stream 31 includes the SNR, i.e., standard FGS residual, frames from residual image encoder 14. Video encoded streams 31, 32 can be transmitted independently or combined to produce a single enhancement layer stream.

Figure 2A:
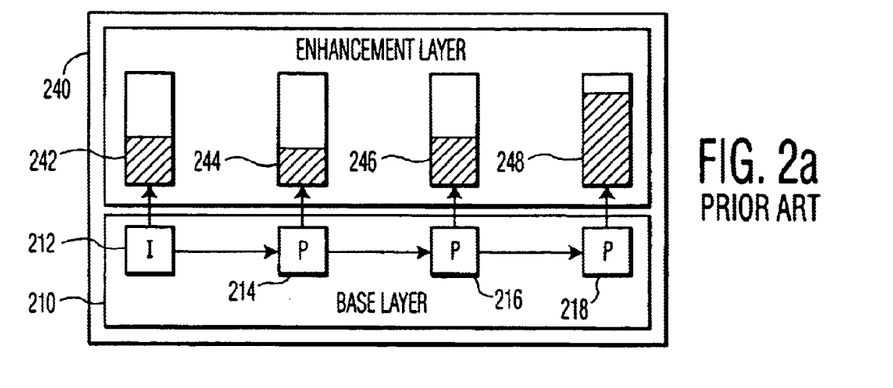
FIGS. 2a–2c illustrates examples of hybrid temporal-SNR FGS encoded structures.

Referring now to FIG. 2a, there is shown an exemplary sequence of the hybrid temporal-SNR scalability structure wherein only the illustrated encoded video frames 242, 244, 246, 248, etc. of FGS enhancement layer 240 are transmitted. The enhancement layer FGS layer frames are transmitted concurrently with the illustrated base layer encoded frames 212, 214, 216, 218, etc. In this case, a high quality video image is obtainable as the FGS enhancement layer 240 frames supplement the encoded data in corresponding base layer 210 frames. As will be appreciated, the number of bits of FGS encoded blocks 242, 244, 246, 248, etc., transmitted is limited by the available bandwidth. Hence, only a finite number of the FGS encoded information items or data bits can be transmitted at the time of transmission.

In this case of no temporal enhancement data transmission, the transmitted base layer frame data and FGS enhancement layer frame data is transmitted in alternate frames. To maintain a consistent frame rate, at a receiving system (not shown), a decoder copies the received frames into the un-transmitted frames. Hence, received frames, e.g., 212/242, are duplicated in the received sequence (not shown) to simplify the receiver processing.

Figure 2B:
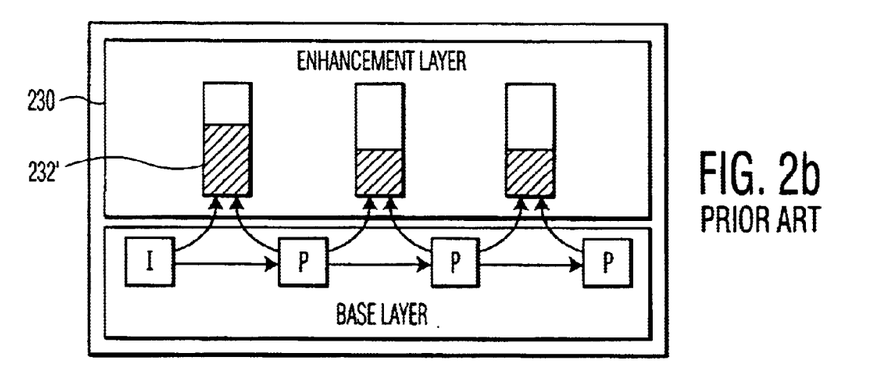

Referring now to FIG. 2b, there is shown an exemplary sequence of the hybrid temporal-SNR scalability structure wherein only temporal layer (i.e., FGST) frames are transmitted. In this case, information items in base layer frame 210 and in temporal layer frame 232' are alternately transmitted. In this exemplary example, the image quality corresponds principally to that of the base-layer 210 with a smooth motion of objects from frame-to-frame.

Figure 2C:
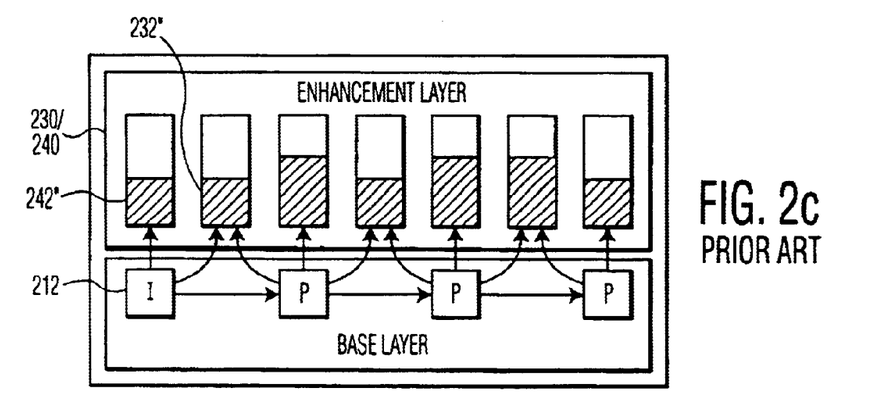

Referring now to FIG. 2c there is shown an exemplary transmission sequence of the hybrid temporal-SNR scalability structure wherein both FGST encoded enhancement layer 230 and FGS encoded enhancement layer 240 frame data is transmitted. In this case, both quality and temporal scalability is achieved. In this illustrative example, encoded data in base layer frame 212 and encoded data in corresponding FGS enhancement layer frame 242" are transmitted followed by FGST enhancement layer frame data 232". It would be appreciated that the transmission sequence is only one example of transmission and that to both the FGS and FGST layers may be transmitted concurrently over parallel channels.

FGS rate controller 28 and Real-time Scalable video rate controller 18 or FIG. 1 determines the number of bits that can be transmitted in each of the above referred to transmission schemes using a first method when only one enhancement layer is transmitted and a second method when a combination of SNR and temporal enhancement is necessary.

In the first method of determining the number of transmission bits, referred to hereinafter as method A, it will be appreciated, that the data bits transmitted one of the enhancement layers is equal to zero, as that enhancement layer is not transmitted. Thus for quality only enhancement, i.e., SNR-only, the bit rate of the FGST layer is equal to zero. Accordingly, the number of encoded FGS enhancement layer frame bits transmitted can be determined as:

$$F_{eA}^{FGS} = \frac{R_{enh}}{f_t} = \frac{R - R_{BL}}{f_{BL}} \quad [1]$$

where:

$F^{FGS}_{eA}$ is the number of bits for each FGS enhancement frame;

$F^{FGST}_{eA} = 0$;

$R_{enh}$ is the bit-rate available for the enhancement layer at transmission time;

$f_t$ is the transmission frame rate

R is the total bandwidth available at transmission time;

$f_{BL}$ is the base layer frame rate and;

$R_{BL}$ is the base-layer bit-rate.

In contrast, when object image motion-smoothness is a primary consideration, i.e., FIG. 2b or 2c, then bit-rate available for the enhancement layers $R_{enh}$ at transmission time must accommodate both FGS encoded enhancement layer frames and FGST encoded enhancement layer frames. The overall transmission frame rate of the transmission of both FGS encoded and FGST encoded enhancement layer is determined as $f_{BL}+f_{EL}$. In a preferred embodiment, the number of bits for each FGS and FGST enhancement layer frame is divided substantially evenly among the transmission frames. Hence, the number of bits, in each enhancement layer, can be determined as:

$$F_{eB}^{FGS} = F_e^{FGST} = \frac{R_{enh}}{f_t} = \frac{F_{eA}^{FGS}}{f_{BL} + f_{EL}} \quad [2]$$

where $F^{FGS}_{eB}$ is the number of bits for an FGS frame;

$F^{FGST}_{eB}$ is the number of bits for an FGST frame; and $f_{EL}$ is the over all enhancement-layer bit-rate.

In this second method of determining the number of transmission bits, referred to hereinafter as method B, when only one FGST frame is inserted between two FGS frames, i.e., $f_{EL}=f_{BL}$, such as illustrated in FIG. 2c, the number of bits in each transmission frame can be represented as:

$$F_{eB}^{FGS} = F_{eB}^{FGST} = \frac{R_{enh}}{f_t} = \frac{F_{eA}^{FGS}}{2} \quad [3]$$

In this case, only one-half the number of bits of the enhancement FGS layer is transmitted. Consequently, the image quality is correspondingly reduced as the number of FGS enhancement bits used to improve the quality of the base layer is reduced. As will be appreciated, the number of temporal enhancement layers between FGS enhancement layers may include any number of layers. In this case, as the number of bits transmitted in each layer is, preferably, substantially the same, the object motion is significantly smoother.

Referring now to method A, because FGST encoded enhancement layer frames 232, 234, etc., are not transmitted, each encoded FGS enhancement layer frame 242, 244, etc, may be represented as FGS(i), i=1, 3, 5, 7, . . . n.

The Peak Signal to Noise Ratio (PSNR) value, which is a measure of quality for each frame may then be determined and represented as PSNR(FGS(j)) where j=1, 2, . . . n. As will be appreciated, the $PSNR_A$ (FGS (i)) is substantially similar to that of $PSNR_A$ (FGS (i+1)). However, when a frame image contains a high degree of motion, the difference in the image content between adjacent frames at $2f_{BL}$, i.e., ($PSNR_A$ (FGS (i)) and $PSNR_A$ (FGS (i+1)), is relatively high. Hence, PSNR values of the transmitted frames are considerably higher than for the previous frames, i.e., $PSNR_A$ (FGS (i))>>$PSNR_A$ (FGS (i+1)).

With regard to the transmission shown in FIG. 2d, where both FGS enhancement layer 240 and FGST enhancement layer 230 are transmitted, there is a relatively small variation between PSNR values of adjacent frames and the PSNR measures of the adjacent frames are substantially the same, i.e., $PSNR_B$ (FGS (i))≈$PSNR_B$ (FGS (i+1)).

Figure 3A:
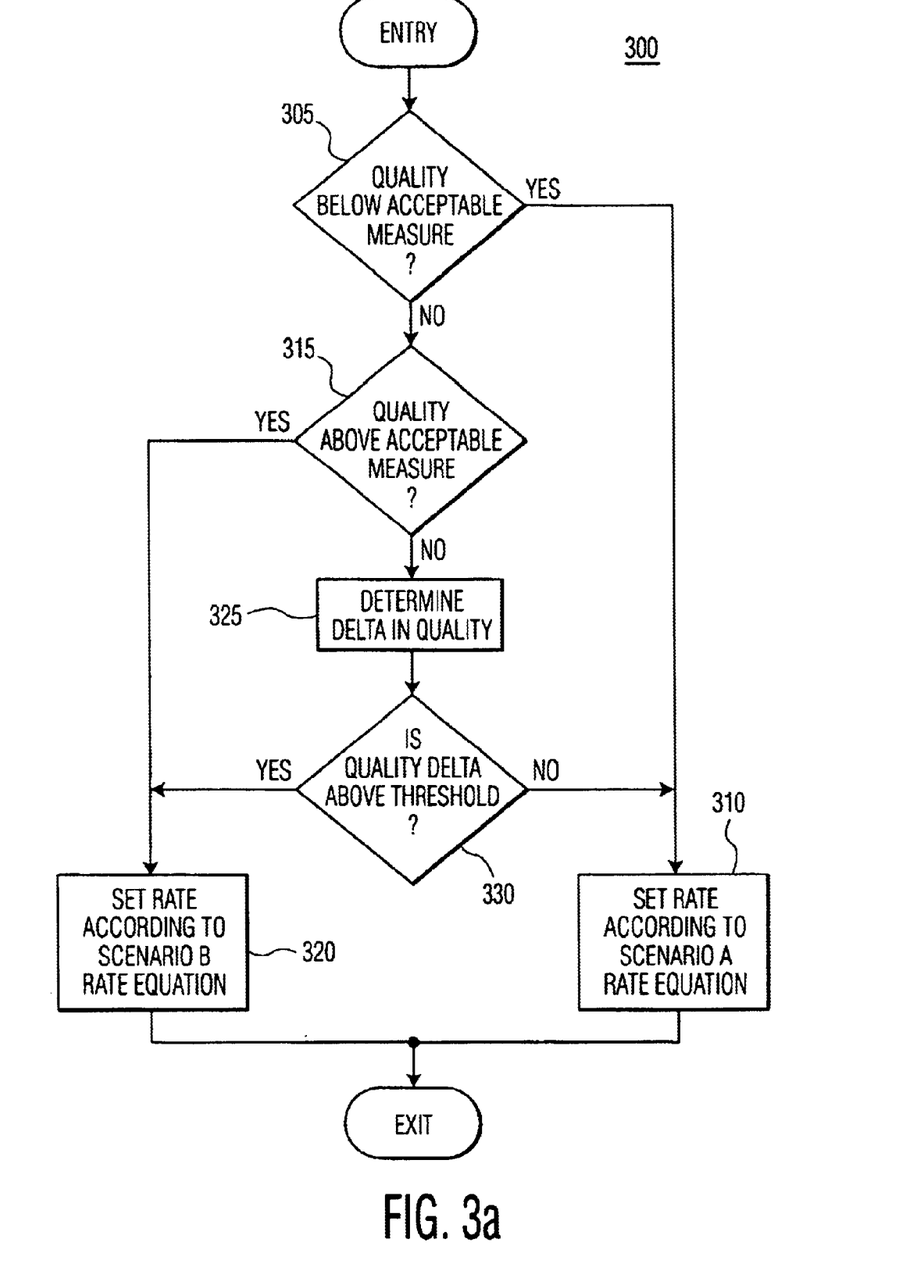
FIG. 3a illustrates a flow chart of rate-control determination processing in accordance with the principles of the invention.

FIG. 3a depicts a flow-chart of an exemplary processing sequence for determining the number of FGS layer 240 bits and FGST layer 230 bits to transmit in order to achieve an optimal visual quality.

At block 305 a determination is made as to whether the PSNR measure of a method B FGST encoded next frame ($PSNR_B$(i+1)) is below a known level. If the answer is in the affirmative, then a number of bits to be transmitted for each layer is determined in accordance with method A, i.e., equation 1, as improving quality is a high priority. In this case, the available enhancement layer bandwidth is occupied totally by bits of FGS layer 240 information items.

If, however, the determination at block 305 is in the negative, then a determination is made at block 315 as to whether the PSNR measure of a method B FGST encoded current frame is above a known level. If the answer is in the affirmative, then the number of bits to be transmitted for each layer is determined in accordance with method B, i.e., equation 2, as the quality is of a sufficient level, and motion-smoothness is most important.

If, however, the determination at block 315 is in the negative, then, at block 325 the difference in PSNR measure between a current frame in both methods A and B is determined. In addition, the difference in PSNR measure between the current frame and the next frame in method A is determined. A ratio of the latter quality measure with respect to the former quality measure expressed as:

($PSNR_A$(FGS(i+1)-$PSNR_A$(FGS(i))/($PSNR_A$(FGS(i)-$PSNR_B$(FGS(i))), is determined at block 325.

At block 330 a determination is made as to whether the determined ratio of PSNR differences is less than a known threshold value. If the ratio of PSNR differences is less than a known threshold value, then the number of bits to be transmitted for each layer is determined in accordance with method A, i.e., equation 1. Otherwise, the number of bits to be transmitted for each layer is determined in accordance with method B, i.e., equation 2.

As will be appreciated the computation of PSNR measure and PSNR difference measure can be performed only at transmission time, when the available bandwidth R is known. In an alternative embodiment, PSNR measures and corresponding FGS layer 240 and FGST layer 230 informational data items can be determined in non-real-time for a plurality of known bit-rates, $R_k$, k=1, . . . , m and stored for future reference. Thus, at transmission time the pre-stored, pre-determined FGS layer 240 and FGST layer 230 information item PSNR values may be accessed for available bit rates, where $R_{k+1}$>R>=$R_k$.

For good performance, the known threshold is related to the image quality of the FGS enhancement layer 240 and FGST enhancement layer 230 frames and the available bit-rate, R. More specifically, as the quality of the FGS enhancement layer frames 240 increases, the disturbing visual effect introduced by motion jerkiness becomes less tolerable. As more transmission bandwidth, or higher bit-rate, R is made available, the corresponding quality of the individual images increases. Thus an increased number of FGST layer frames can be transmitted to improve visual quality.

Figure 3B:
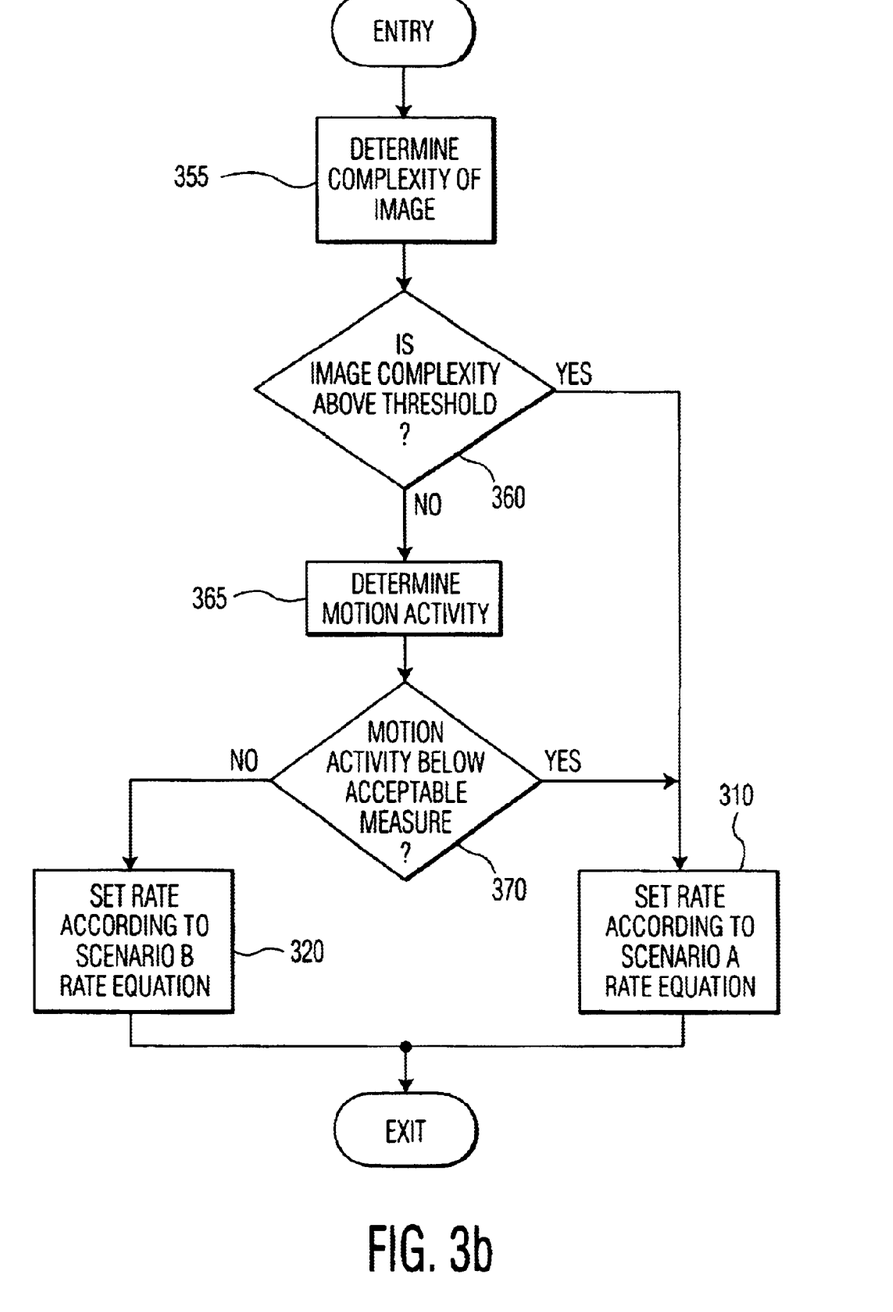
FIG. 3b illustrates a flow chart of rate-control determination processing in accordance with a second embodiment of the invention.

FIG. 3b illustrates a flow chart of a second embodiment for rate-determination 350 in accordance with the principles of the invention. In this embodiment, a determination is made, at block 355, regarding the complexity of the image or scene. One method for determining scene complexity is disclosed in "MPEG-2 Test Model 5, Coded Representation of Picture and Audio Information, ISO/IEC JTC1/SC29/WG11/N0400, April 1993." At block 360, a determination is made whether the scene complexity is above a known threshold. If the answer is in the affirmative, then a number of bits to be transmitted for each layer is determined, at block 310, in accordance with method A, i.e., equation 1, as the scene is complex and improving quality is a high priority. In this case, the available enhancement bandwidth is occupied by quality enhancement bits of FGS layer 230.

However, if the answer is in the negative, then the motion activity of an FGST frame is determined, at block 365. In one embodiment, motion activity can be determined by evaluating the number of bits required for transmitting motion vectors. At block 370, a determination is made whether motion activity is below an acceptable threshold. If the answer is in the affirmative, then a number of bits to be transmitted for each layer is determined, at block 310, in accordance with method A, i.e., equation 1, as there is little motion activity in the scene and improving quality is a high priority. In this case, the available enhancement bandwidth is occupied totally by bits of FGS layer 240 information items.

However, if the answer is in the negative, then the number of bits to be transmitted for each FGS and FGST enhancement layer is determined, at block 320, in accordance with method B, i.e., equation 2, as the quality of the scene is of a sufficient level and motion-smoothness is most important. For example, a sufficient level may be determined when the complex measure is above 300,000 and the motion vector is at least equal to 6000 bits for CIF resolution images at 10 Hz.

Figure 4:
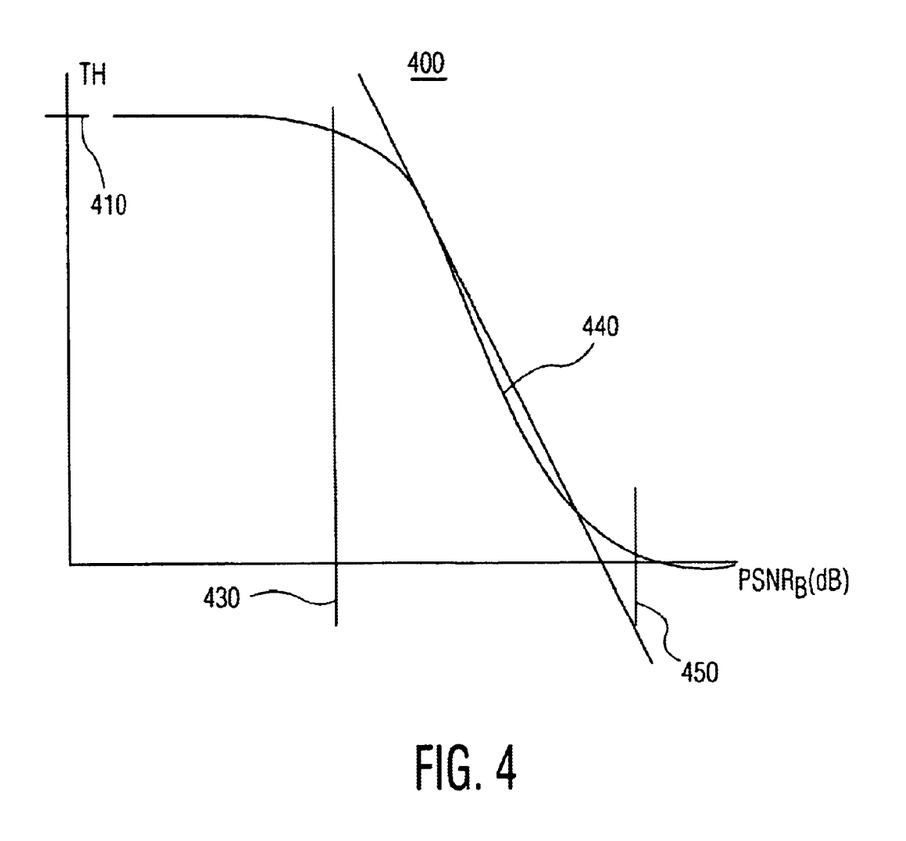
FIG. 4 shows a graph of threshold setting with regard to image quality in accordance with the principles of the invention.

FIG. 4 illustrates an exemplary graph 400 for determining a threshold value, referred to in block 330 of FIG. 3a, as a function the measure of PSNR measure of FGST enhancement layer 230 frames. As illustrated, the threshold value is set at a maximum value 410 when the PSNR measure is below a known low value, represented as 430 and decreases, monotonically, represented by decreasing line 440 as the PSNR measure increases. The determined threshold is set at a minimum value when the PSNR measure is above a known level, represented as 450.

Although the invention has been disclosed with regard to comparison between a current frame and a next frame, it will be appreciated that the consistency of the switching between FGS enhancement layers and FGST enhancement layers can be improved if the decisions, illustrated in FIG. 3, are performed on a larger group of frames which employ the same method.

Figure 5A:
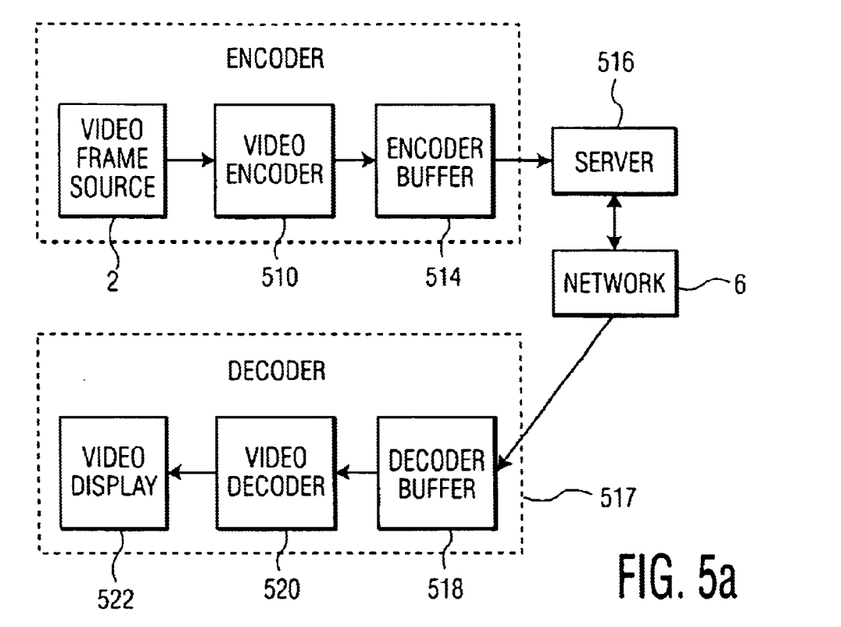
FIGS. 5a–5b illustrates an exemplary systems that utilize the principles of the present invention.
Figure 5B:
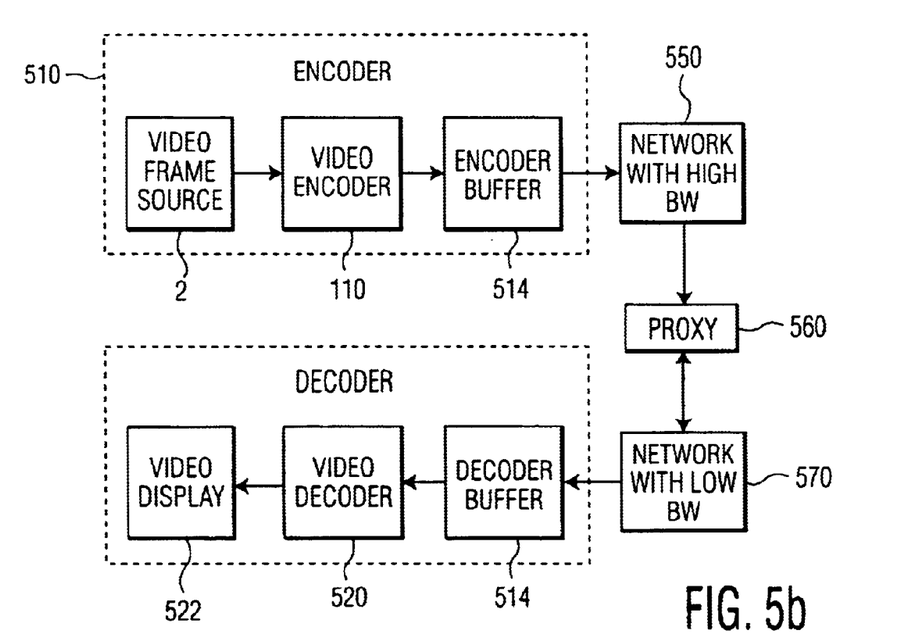

FIG. 5a illustrates an exemplary transmission system 500 utilizing the principles of the present invention. In this case, video data is provided by video frame source 2 to video encoding unit 110. Video encoded data is then stored in encoder buffer 514. Server 516 receives the video encoded information and tailors the transmission bit stream according to varying bandwidth conditions, packet losses or user preferences over data network 6. At receiving system 517, the received data frames are stored in decoder buffer 518 and provided to video decoder 520. Video decoder 520 extracts and decodes the received information. The decoded information items are next presented on video display 522 or may be stored on a, not shown, video recording device, such as, an analog video recorder or a digital video recorder. FIG. 5b illustrates a second embodiment of a system wherein the a high bandwidth network 550, which has a high bandwidth, receives the video encoded information and tailors the transmission bit stream through proxy 560, according to varying bandwidth conditions, packet losses or user preferences to network 570.

Figure 6:
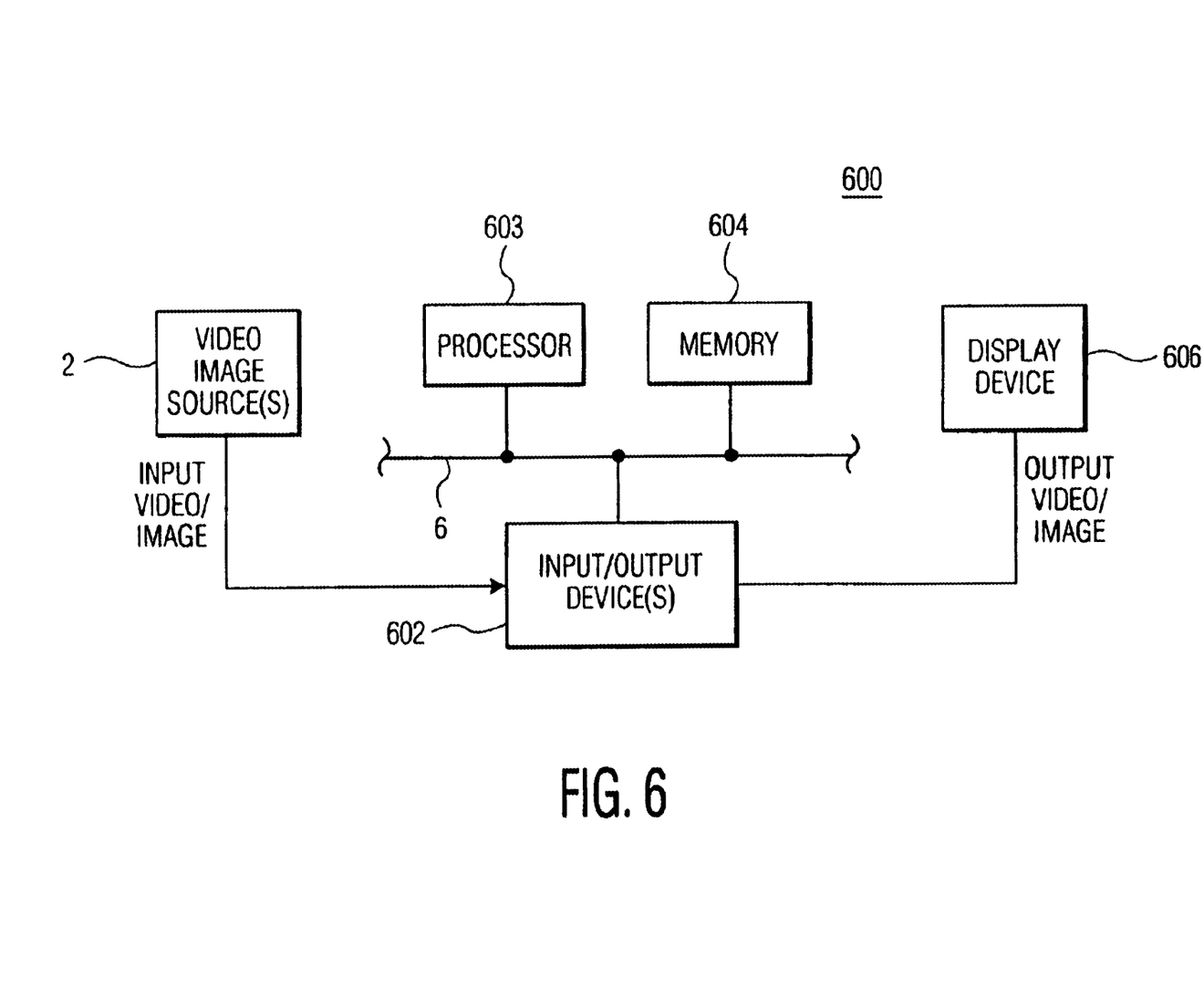
FIG. 6 shows an exemplary embodiment of a transmission system which may be used for implementing the principles of the present invention.

FIG. 6 shows an exemplary embodiment of a system 600 which may be used for implementing the principles of the present invention. System 600 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. System 800 includes one or more video/image sources 2, one or more input/output devices 602, a processor 603 and a memory 604. The video/image source(s) 2 may represent, e.g., a television receiver, a VCR or other video/image storage device. The source(s) 2 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 602, processor 603 and memory 604 may communicate over a communication medium 6. The communication medium 6 may represent, e.g., a bus, a communication network, one or more internal connections of a circuit, circuit card or other device, as well as portions and combinations of these and other communication media. Input video data from the source(s) 2 is processed in accordance with one or more software programs stored in memory 604 and executed by processor 603 in order to generate output video/images supplied to a display device 606.

In a preferred embodiment, the coding and decoding employing the principles of the present invention may be implemented by computer readable code executed by the system. The code may be stored in the memory 604 or read/downloaded from a memory medium such as a CD-ROM or floppy disk. In other embodiments, hardware circuitry may be used in place of, or in combination with, software instructions to implement the invention. For example, the elements illustrated herein may also be implemented as discrete hardware elements.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A method for determining a number of transmission bits, at a known bit-rate, for each of a current quality enhancement layer frame and a current temporal enhancement layer frame in a transmission of a fine granular enhanced encoded video frame, said method comprising the steps of:

comparing a ratio of a first measure of said quality enhancement layer frame and a second measure of said quality enhancement layer frame and said temporal enhancement layer frame to a known threshold; and determining said number of transmission bits using a first method when said ratio is below a known threshold and using a second method otherwise.

2. The method as recited in claim 1 wherein said first measure is a difference in quality measure between said current quality enhancement layer frame and at least one next quality enhancement layer frame, said current frame quality measure and said at least one next frame quality measure is determined using a number of bits determined in accordance with said first method.

3. The method as recited in claim 1 wherein said second measure is a difference in quality measure between said current quality enhancement layer frame and at least one next temporal enhancement layer frame, said current frame quality measure is determined using a number of bits determined in accordance with said first method and said at least one next temporal enhancement layer frame quality measure is determined using a number of bits determined in accordance with said second method.

4. The method as recited in claim 1 wherein said threshold is selected in accordance with said temporal enhancement layer frame measure, wherein said temporal enhancement layer frame measure is determined using a number of bits determined in accordance with said second method.

5. The method as recited in claim 4 wherein said threshold monotonically decreases as said temporal enhancement layer frame measure increases.

6. The method as recited in claim 1 further comprising the steps of:

comparing a measure of at least one next temporal enhancement layer frame to a known level; and determining said number of transmission bits in accordance with said first method when said measure is below said known level.

7. The method as recited in claim 6 wherein said measure of at least one temporal enhancement layer frame is determined using a number of bits determined in accordance with said second method.

8. The method as recited in claim 1 further comprising the steps of:
comparing a measure of said current temporal enhancement layer frame with a second known level; and
determining said number of transmission bits in accordance with said second method when said measure is above said second known level.

9. The method as recited in claim 8 wherein said measure of said current temporal enhancement layer frame is determined using a number of bits determined in accordance with said second method.

10. The method as recited in claim 1 wherein said first method is determined in accordance with $$F_{eA}^{FGS} = \frac{R_{enh}}{f_t} = \frac{R - R_{BL}}{f_{BL}}$$

where:
$F^{FGS}_{eA}$ is the number of bits for each FGS enhancement frame;
$F^{FGST}_{eA} = 0$;
$R_{enh}$ is the bit-rate available for the enhancement layer at transmission time;
$f_t$ is the transmission frame rate
R is the total bandwidth available at transmission time;
$f_{BL}$ is the base layer frame rate and;
$R_{BL}$ is the base-layer bit-rate.

11. The method as recited in claim 1 wherein said second method is determined in accordance with $$F_{eB}^{FGS} = F_e^{FGST} = \frac{R_{enh}}{f_t} = \frac{F_{eA}^{FGS}}{f_{BL} + f_{EL}}$$

where
$F^{FGS}_{eB}$ is the number of bits for an FGS frame;
$F^{FGST}_{eB}$ is the number of bits for an FGST frame; and
$f_{EL}$ is the over all enhancement-layer bit-rate.

12. A device for determining a number of transmission bits, at a known bit-rate, for each of a current quality enhancement layer frame and a current temporal enhancement layer frame in a transmission of a fine granular encoded video frame, said device including:
code for comparing a ratio of a first measure of said quality enhancement layer frame and a second measure of said quality enhancement layer frame and said temporal enhancement layer frame to a known threshold; and
code for determining said number of transmission bits using a first method when said ratio is above a known threshold and using a second method otherwise.

13. The device as recited in claim 12 further including:
code for determining said first measure as a difference in quality between said current quality enhancement layer frame and at least one next quality enhancement layer frame, wherein said quality measure of said current frame and said at least one next frame is determined using a number of bits determined in accordance with said first method.

14. The device as recited in claim 12 further including:
code for determining said second measure as a difference in quality measure between said current quality enhancement layer frame and at least one next temporal enhancement layer frame wherein said current frame quality measure is determined using a number of bits determined in accordance with said first method and said at least one next temporal enhancement layer frame quality measure is determined using a number of bits determined in accordance with said second method.

15. The device as recited in claim 12 further including:
code for determining said threshold in accordance with said temporal enhancement layer frame measure, wherein said temporal enhancement layer frame measure is determined using a number of bits determined in accordance with said second method.

16. The device as recited 15 wherein said threshold monotonically decreases as said temporal enhancement layer frame measure increases.

17. The device as recited in claim 12 further including:
code for comparing a measure of at least one next temporal enhancement layer frame to a known level; and
code for determining said number of transmission bits in accordance with said first method when said measure is below said known level.

18. The device as recited in claim 17 wherein said measure of at least one temporal enhancement layer frame is determined using a number of bits determined in accordance with said second method.

19. The device as recited in claim 1 further including:
code for comparing a measure of said current temporal enhancement layer frame with a second known level; and
code for determining said number of transmission bits in accordance with said second method when said measure is above said second known level.

20. The device as recited in claim 19 wherein said current temporal enhancement layer frame measure is determined using a number of bits determined in accordance with said second method.

21. The device as recited in claim 12 further including:
code for determining said first method in accordance with $$F_{eA}^{FGS} = \frac{R_{enh}}{f_t} = \frac{R - R_{BL}}{f_{BL}}$$

where:
$F^{FGS}_{eA}$ is the number of bits for each FGS enhancement frame;
$F^{FGST}_{eA} = 0$;
$R_{enh}$ is the bit-rate available for the enhancement layer at transmission time;
$f_t$ is the transmission frame rate
R is the total bandwidth available at transmission time;
$f_{BL}$ is the base layer frame rate and;
$R_{BL}$ is the base-layer bit-rate.

22. The device as recited in claim 12 further including:
code for determining said second method in accordance with $$F_{eB}^{FGS} = F_e^{FGST} = \frac{R_{enh}}{f_t} = \frac{F_{eA}^{FGS}}{f_{BL} + f_{EL}}$$

where $F^{FGS}{}_{eB}$ is the number of bits for an FGS frame;
$F^{FGST}{}_{eB}$ is the number of bits for an FGST frame; and
$f_{EL}$ is the over all enhancement-layer bit-rate.

23. The method as recited in claim 10 wherein said number of transmission bits in said temporal layer enhancement frame is zero.

24. The device as recited in claim 21 further including:
code to set said number of transmission bits in said temporal enhancement layer frame to zero.

25. An memory module containing code therein for determining the number of transmission bits in each of a current quality enhancement layer frame and a current temporal enhancement layer frame in a transmission of a fine granular scalability encoded video frame, said memory module code being operable to:
compare a measure of at least one next temporal enhancement layer frame to a known level;
determine said number of transmission bits in accordance with a first method when said measure is below said known level;
compare a measure of a current temporal enhancement layer frame with a second known level;
determine said number of transmission bits in accordance with a second method when said second measure is above said second known level;
compare a ratio of a measure of said quality enhancement layer frame and a measure of said quality enhancement layer frame and said temporal enhancement layer frame to a known threshold; and
determine said number of transmission bits in accordance with said first method when said ratio is above a known threshold and in accordance with said second method otherwise.

26. The memory module code as recited in claim 25 further operable to:
determine said at least one temporal enhancement layer frame using a number of bits determined in accordance with said second method.

27. The memory module code as recited in claim 25 further operable to:
determine said current temporal enhancement layer frame measure using a number of bits determined in accordance with said second method.

28. The memory module code as recited in claim 25 further operable to:
determine a quality measure of said current quality enhancement layer frame using a number of bits determined in accordance with said first method;
determine a quality measure of at least one next quality enhancement layer frame using a number of bits determined in accordance with said first method; and
determine said quality enhancement layer frame measure as a difference in said current quality enhancement layer frame quality measure and at least one next quality enhancement layer frame quality measure.

29. The memory module code as recited in claim 25 further operable to:
determine a quality measure of said current quality enhancement layer frame using a number of bits determined in accordance with said first method;
determine a quality measure of said at least one next temporal enhancement layer frame using a number of bits determined in accordance with said second method; and
determine said quality enhancement layer frame and said temporal enhancement layer frame measure as a difference in said current quality enhancement layer frame quality measure and said at least one next temporal enhancement layer frame quality measure.

30. The memory module code as recited in claim 25 further operable to determine said first method in accordance with $$F_{eA}^{FGS} = \frac{R_{enh}}{f_t} = \frac{R - R_{BL}}{f_{BL}}$$

where:
$F^{FGS}{}_{eA}$ is the number of bits for each FGS enhancement frame;
$F^{FGST}{}_{eA}=0$;
$R_{enh}$ is the bit-rate available for the enhancement layer at transmission time;
$f_t$ is the transmission frame rate
R is the total bandwidth available at transmission time;
$f_{BL}$ is the base layer frame rate and;
$R_{BL}$ is the base-layer bit-rate.

31. The memory module code as recited in claim 30 further operable to:
determine said number of transmission bits in said temporal enhancement layer frame to zero.

32. The memory module code as recited in claim 25 further operable to determine said second method in accordance with $$F_{eB}^{FGS} = F_e^{FGST} = \frac{R_{enh}}{f_t} = \frac{F_{eA}^{FGS}}{f_{BL} + f_{EL}}$$

where
$F^{FGS}{}_{eB}$ is the number of bits for an FGS frame;
$F^{FGST}{}_{eB}$ is the number of bits for an FGST frame; and
$f_{EL}$ is the over all enhancement-layer bit-rate.

33. A method for determining a number of transmission bits, at a known bit-rate, for each of a current quality enhancement layer frame and a current temporal enhancement layer frame in a transmission of a fine granular enhanced encoded video frame, said method comprising the steps of:
determining said number of transmission bits using a first method when a quality layer frame measure is above an known threshold;
determining said number of transmission bits using said first method when a temporal enhancement layer frame measure is below an acceptable measure;
otherwise, determining said number of transmission bits using a second method.

34. The method as recited in claim 33 wherein said second method is determined in accordance with $$F_{eB}^{FGS} = F_e^{FGST} = \frac{R_{enh}}{f_t} = \frac{F_{eA}^{FGS}}{f_{BL} + f_{EL}}$$

where
$F^{FGS}{}_{eB}$ is the number of bits for an FGS frame;
$F^{FGST}{}_{eB}$ is the number of bits for an FGST frame; and
$f_{EL}$ is the over all enhancement-layer bit-rate.

35. The method as recited in claim 33 wherein said first method is determined in accordance with $$F_{eA}^{FGS} = \frac{R_{enh}}{f_t} = \frac{R - R_{BL}}{f_{BL}}$$

where:
   $F^{FGS}_{eA}$ is the number of bits for each FGS enhancement frame;
   $F^{FGST}_{eA} = 0$;
   $R_{enh}$ is the bit-rate available for the enhancement layer at transmission time;
   $f_t$ is the transmission frame rate
   R is the total bandwidth available at transmission time;
   $f_{BL}$ is the base layer frame rate and;
   $R_{BL}$ is the base-layer bit-rate.

36. The method as recited in claim 33 wherein said temporal enhancement layer frame measure is determined from a motion activity measure in said frame.

37. The method as recited in claim 33 wherein said quality layer frame measure is determined from a complexity measure of said frame.

38. The method as recited in claim 36, wherein said motion activity measure is determined in relation to motion vectors of said frame.

* * * * *